(12) United States Patent
Lee et al.

(10) Patent No.: US 9,514,511 B2
(45) Date of Patent: Dec. 6, 2016

(54) TIMING CONTROLLER TO PERFORM PANEL SELF-REFRESH USING COMPRESSED DATA, METHOD OF OPERATING THE SAME, AND DATA PROCESSING SYSTEM INCLUDING THE SAME

(71) Applicant: Samsung Electronics Co., Ltd., Suwon-si, Gyeonggi-do (KR)

(72) Inventors: Jae Chul Lee, Seongnam-si (KR); Jong Seon Kim, Seongnam-si (KR); Wai Dustin, Seongnam-si (KR); Keun Ho Ryu, Hwaseong-si (KR); Jong Sung Lee, Seoul (KR)

(73) Assignee: SAMSUNG ELECTRONICS CO., LTD., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 99 days.

(21) Appl. No.: 14/533,346

(22) Filed: Nov. 5, 2014

(65) Prior Publication Data

US 2015/0130824 A1    May 14, 2015

(30) Foreign Application Priority Data

Nov. 13, 2013  (KR) ........................ 10-2013-0137529

(51) Int. Cl.
    G09G 5/39    (2006.01)
    G06T 1/60    (2006.01)
    G09G 3/20    (2006.01)
    G09G 5/00    (2006.01)

(52) U.S. Cl.
    CPC . *G06T 1/60* (2013.01); *G09G 3/20* (2013.01); *G09G 5/006* (2013.01); *G09G 5/39* (2013.01); *G09G 2320/0613* (2013.01); *G09G 2320/10* (2013.01); *G09G 2330/12* (2013.01); *G09G 2340/02* (2013.01); *G09G 2340/0435* (2013.01); *G09G 2360/18* (2013.01); *G09G 2370/10* (2013.01)

(58) Field of Classification Search
    None
    See application file for complete search history.

(56) References Cited

U.S. PATENT DOCUMENTS

| 7,123,246 | B2 | 10/2006 | Nakatani et al. |
| 7,911,874 | B2 | 3/2011 | Kawabata et al. |
| 2009/0146935 | A1 | 6/2009 | Song et al. |
| 2011/0199404 | A1 | 8/2011 | Umezaki et al. |
| 2011/0292059 | A1 | 12/2011 | Kobayashi |

(Continued)

FOREIGN PATENT DOCUMENTS

| KR | 101158876 | 6/2012 |
| KR | 1020130051817 | 5/2013 |
| KR | 1020130076898 | 7/2013 |

*Primary Examiner* — Jacinta M Crawford
(74) *Attorney, Agent, or Firm* — Muir Patent Law, PLLC

(57) ABSTRACT

A method of operating a timing controller, which communicates with a host through a mobile industry processor interface (MIPI) and communicates with a display panel module through a display interface, is provided. The method includes storing image data compressed by one of the host and the timing controller in a frame memory, decompressing the image data stored in the frame memory, and performing panel self-refresh on the display panel module using the decompressed image data.

20 Claims, 9 Drawing Sheets

(56) References Cited

U.S. PATENT DOCUMENTS

| | | |
|---|---|---|
| 2012/0038618 A1 | 2/2012 | Koyama |
| 2012/0133659 A1 | 5/2012 | Masnikosa et al. |
| 2012/0242671 A1 | 9/2012 | Wyatt |
| 2013/0021352 A1* | 1/2013 | Wyatt ............... G09G 5/395 345/520 |
| 2013/0033510 A1 | 2/2013 | Dou et al. |
| 2013/0044813 A1 | 2/2013 | Boon et al. |
| 2013/0057763 A1* | 3/2013 | Cha ............... G09G 5/006 348/554 |
| 2013/0141642 A1 | 6/2013 | Wu et al. |
| 2013/0300723 A1* | 11/2013 | Wu ............... G09G 5/18 345/212 |

* cited by examiner

TIMING CONTROLLER TO PERFORM PANEL SELF-REFRESH USING COMPRESSED DATA, METHOD OF OPERATING THE SAME, AND DATA PROCESSING SYSTEM INCLUDING THE SAME

CROSS-REFERENCE TO RELATED APPLICATIONS

This application claims priority under 35 U.S.C. §119(a) from Korean Patent Application No. 10-2013-0137529 filed on Nov. 13, 2013, the disclosure of which is hereby incorporated by reference in its entirety.

BACKGROUND

1. Field

Embodiments of the inventive concept relate to a timing controller, and more particularly, to a timing controller to perform panel self-refresh using compressed data, a method of operating the same, and a data processing system including the same.

2. Description of the Related Art

In a mobile industry processor interface, a display serial interface (MIPI® DSI) is a recent display standard for mobile electronic devices. The MIPI supports two types of display standards, i.e., a video mode and a command mode.

In the video mode, frame data is transmitted from a host to a display driver integrated circuit (IC) in real time. Even when the image data to be transmitted to the display driver IC is still image data, the host continuously transmits the same still image data to the display driver IC in the video mode, which increases the power consumption of the host.

In the command mode, when still image data is displayed on a display, the display driver IC periodically reads the still image data from a frame buffer included therein and transmits the read still image data to the display. This operation is referred to as panel self-refresh (PSR).

SUMMARY

Some embodiments of the inventive concept provide a timing controller to perform panel self-refresh (PSR) on a display using compressed data, a method of operating the same, and a data processing system including the same.

Some embodiments of the inventive concept also provide a timing controller to control a transmission timing of image data using frame information (i.e., information about a size of a vertical blank area), a method of operating the same, and a data processing system including the same.

Some embodiments of the inventive concept also provide a timing controller to control an external device that supports an inter-integrated chip (I2C) protocol using a mobile industry processor interface (MIPI) command, a method of operating the same, and a data processing system including the same.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a method of operating a timing controller which communicates with a host through a MIPI interface and communicates with a display panel module through a display interface. The method may include storing image data compressed by one of the host and the timing controller in a frame memory, decompressing the image data stored in the frame memory, and performing panel self-refresh on the display panel module using the decompressed image data.

When the image data is first image data compressed by the host, the first image data may be passed to the frame memory. When the image data is second image data compressed by the timing controller, a first portion of the second image data and a second portion of the second image data may be stored in the frame memory at different timings.

The decompressing the image data may include assembling and synchronizing the first portion and the second portion which are output from the frame memory and decompressing the first portion and the second portion that have been synchronized with each other.

The first uncompressed image data corresponding to the first portion and second uncompressed image data corresponding to the second portion may be compressed at different timings by different compression circuits, respectively, which are implemented in the timing controller. The first uncompressed image data may be received from the host through a first sub interface of the MIPI interface and the second uncompressed image data may be received from the host through a second sub interface of the MIPI interface.

The first image data and the first portion of the second image data may be output to the frame memory through one processing circuit.

The method may further include receiving a command from the host through the MIPI interface and analyzing the command and adjusting an interval of a tearing off (TE) signal based on an analysis result. The command may include information about a size of a vertical blank area.

The foregoing and/or other features and utilities of the present general inventive concept may also be achieved by providing a timing controller which is connected with a host through a MIPI interface and connected with a display panel module through a display interface. The timing controller may include a frame memory configured to store image data compressed by one of the host and the timing controller, a decoder configured to decompress the image data stored in the frame memory, and an image processing circuit configured to perform panel self-refresh on the display panel module using the decompressed image data.

The foregoing and/or other features and utilities of the present general inventive concept may also be achieved by providing a data processing system including a timing controller connected with a host through a MIPI interface and a display panel module connected with the timing controller through a display interface. The timing controller may include a frame memory configured to store image data compressed by one of the host and the timing controller, a decoder configured to decompress the image data stored in the frame memory, and an image processing circuit configured to perform panel self-refresh on the display panel module using the decompressed image data.

The data processing system may further include a device configured to support an I²C protocol. At this time, the timing controller may further include a command converter configured to convert a MIPI command received through the MIPI interface into an I²C command and the host may control the device using the MIPI command.

The foregoing and/or other features and utilities of the present general inventive concept may also be achieved by providing a non-transitory computer-readable medium to contain computer-readable codes as a program to execute the method described above or hereinafter.

The foregoing and/or other features and utilities of the present general inventive concept may also be achieved by providing a timing controller which is connected with a host through a mobile industry processor interface (MIPI) and connected with a display panel module through a display interface. The timing controller may include a circuit configured to selectively receive compressed image data and uncompressed image data from the host, and to compress the uncompressed image data as another compressed image data, a frame memory configured to store the compressed image data and another compressed image data, a decoder configured to decompress the compressed image data stored in the frame memory to generate another decompressed image data, and an image processing circuit configured to perform panel self-refresh on the display panel module using the another decompressed image data.

The foregoing and/or other features and utilities of the present general inventive concept may also be achieved by providing a data processing system including the host, the timing controller, and the display panel module described above or hereinafter. The host, the timing controller, and the display panel module are separate from one another, connected through the MIPI and the display interface, respectively, and disposed in a single housing of the data processing system.

The data processing system may further include a camera unit to photograph an object to generate data corresponding to the compressed image data or the uncompressed image data. The host may pass the data as the uncompressed image data to the timing controller through the MIPI and may compress the data as the compressed image data to be transmitted to the timing controller through the MIPI.

When the another decompressed image data corresponds to a still image, the timing controller may perform the panel self-refresh using the another decompressed image data.

BRIEF DESCRIPTION OF THE DRAWINGS

These and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
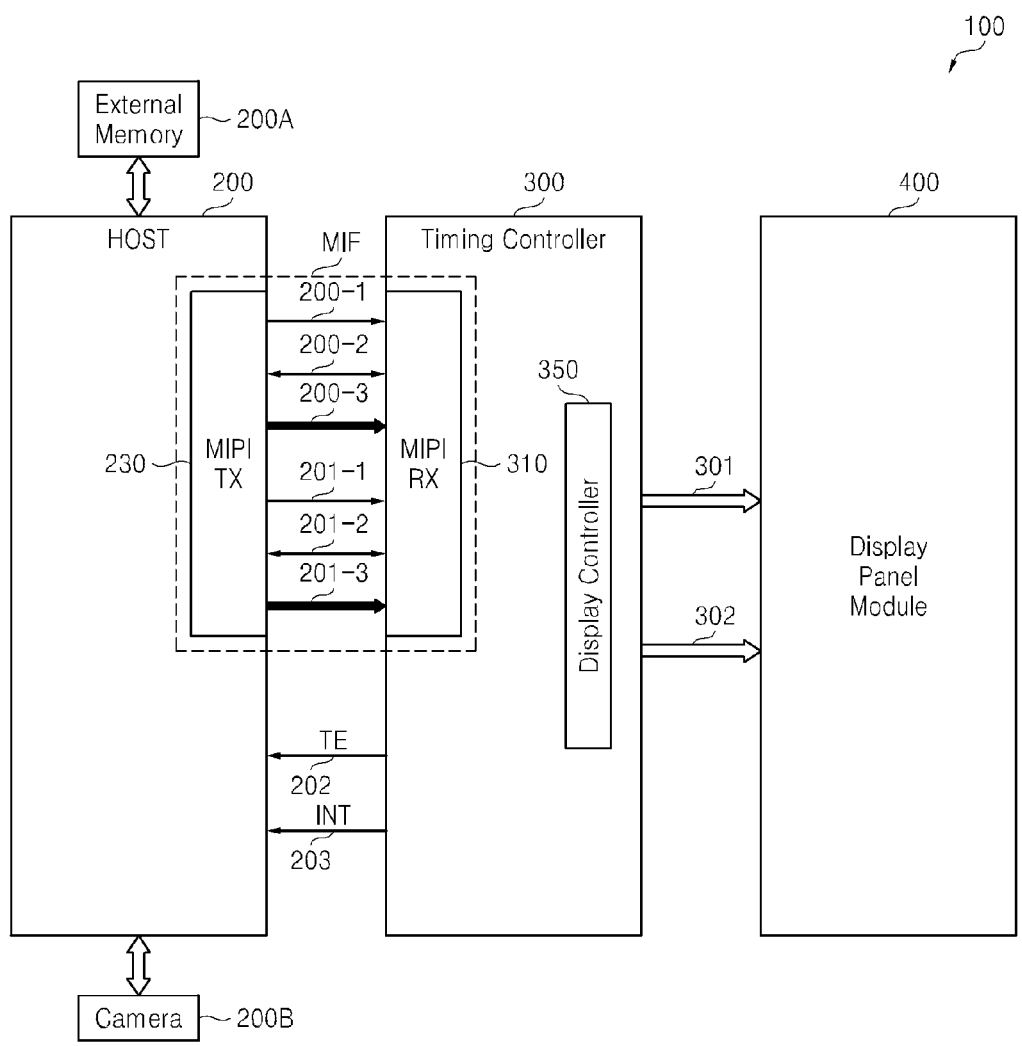
FIG. 1 is a block diagram illustrating a data processing system according to an embodiment of the inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept while referring to the figures.

This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

FIG. 1 is a block diagram illustrating a data processing system 100 according to an embodiment of the present general inventive concept. The data processing system 100 includes a host 200, an external memory 200A, a camera 200B, a timing controller 300, and a display panel module 400.

The data processing system 100 is a system that processes image data and allows the processed image data to be displayed through the display panel module 400. The image data includes still image data or moving image data. The moving image data may be referred to as a video stream. The image data may include two-dimensional (2D) image data or three-dimensional (3D) image data. The image data may be referred to as frame data.

The data processing system 100 may be implemented as a mobile device that can support mobile industry processor interface (MIPI®). Alternatively, the data processing system 100 may be implemented as a smart phone, a tablet personal computer (PC), a digital camera, a camcorder, a personal digital assistant (PDA), a portable multimedia player (PMP), a mobile internet device (MID), an internet of things (IoT) device, an internet of everything (IoE) device, or a wearable computer. The data processing system 100 may have an housing (not illustrated) to accommodate components thereof, for example, the host 200, the timing controller 300, and the display panel module 400, therein. The housing may also accommodate the camera 200B such that a lens portion of the camera 200B is exposed through an opening of the housing to photograph an object. The housing may also accommodate the external memory 200A disposed outside the host 200. It is possible that the external memory 200A may be detachably attached to the housing to be electrically connected to the host 200 A. The data processing system 100 may further include an interface (not illustrated) disposed in the housing to perform a wired and/or wireless communication with an external device, an external communication station, and/or an external access point (AP) which are disposed outside the housing of the data processing system 100. The data processing system 100 may also have a power unit (not illustrated) to receive a power from an outside of the housing, to store the power, and to supply the power to the corresponding components of the data processing system 100.

The host 200 and the timing controller 300 are connected with each other through a first interface, e.g., an MIPI interface MIF. The timing controller 300 and the display panel module 400 are connected with each other through a second interface, e.g., one or more display interfaces 301 and 302.

Although the MIPI interface MIF or an MIPI protocol is explained as an example here for convenience' sake in the description, the inventive concept may also be applied to a display system that includes a different interface from the MIPI interface MIF and a timing controller.

The MIPI interface MIF includes a first sub interface and a second sub interface. The first sub interface may include one clock lane 200-1 and one or more data lanes 200-2 and 200-3. The second sub interface may include one clock lane 201-1 and one or more data lanes 201-2 and 201-3. The data lanes 200-2 and 201-2 may be implemented as bidirectional data lanes and the data lanes 200-3 and 201-3 may be implemented as unidirectional data lanes.

According to an embodiment, the host 200 may control the timing controller 300 using only the first sub interface in a single-mode operation. At this time, the data processing system 100 may be implemented in hardware so as to support the single-mode operation.

According to an embodiment, the host 200 may control the timing controller 300 using both the first sub interface and the second sub interface in a dual-mode operation. At this time, the data processing system 100 may be implemented in hardware so as to support the dual-mode operation.

According to an embodiment, the host 200 may switch from the single-mode operation to the dual-mode operation or vice versa. At this time, the data processing system 100 may be implemented in hardware so as to support both the single-mode operation and the dual-mode operation.

The host 200 may control the external memory 200A, the camera 200B, and/or the timing controller 300. The host 200 may be implemented as an integrated circuit (IC), a system-on-chip (SoC), an application processor (AP), or a mobile AP. The display panel module 400 may be a display unit to display an image according to image data. The display panel modile 400 may further include a user input unit to input a user command and data to control the data processing system 100. In this case, the display panel module 400 may be a touch panel or a motion detection panel to display an image on a screen thereof and to receive a user command and data therethrough. The host 200 may receive the user command and data through a user interface (or user input unit) to control the corresponding components of the data processing system 100.

Figure 2:
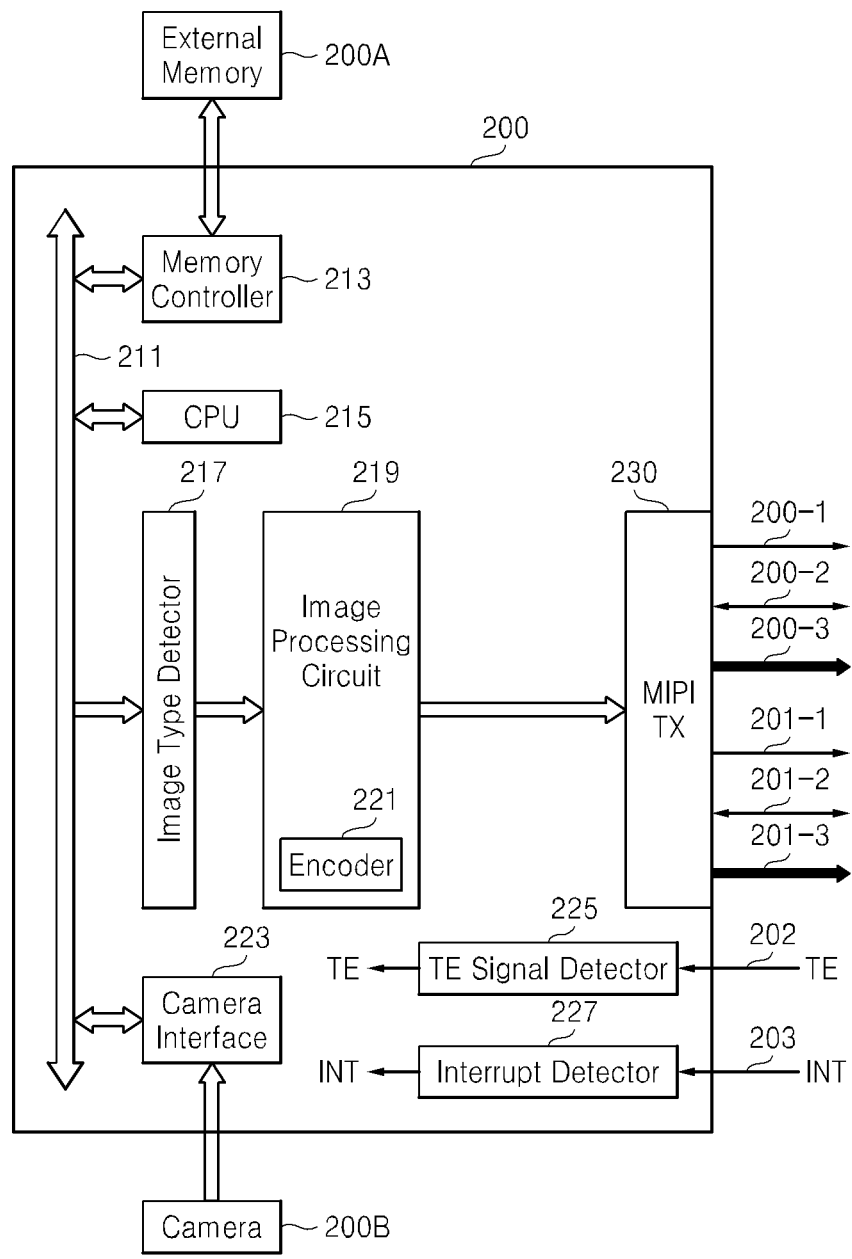
FIG. 2 is a block diagram illustrating a host of the data processing system illustrated in FIG. 1 according to an embodiment of the present general inventive concept.

FIG. 2 is a block diagram illustrating the host 200 of FIG. 1 according to an embodiment of the present general inventive concept. Referring to FIGS. 1 and 2, the host 200 may include a bus 211, a memory controller 213, a central processing unit (CPU) 215, an image type detector 217, an image processing circuit 219, a camera interface 223, a tearing effect (TE) signal detector 225, and an MIPI transmit (TX) interface 230.

The CPU 215 may control components thereof, such as the memory controller 213, the image type detector 217, the image processing circuit 219, a compressor or encoder 221, the camera interface 223, the tearing effect (TE) signal detector 225, and/or the MIPI transmit (TX) interface 230 through the bus 211. The CPU 215 may generate a signal to control the corresponding components. The memory controller 213 may interface image data between the host 200 and the external memory 200A. For instance, image data output from the host 200 may be stored in the external memory 200A, and image data output from the external memory 200A may be transmitted to the bus 211 according to the control of the memory controller 213. The memory controller 213 may generate a signal to control the external memory 200A.

The external memory 200A may be a dynamic random access memory (DRAM), a solid state drive (SSD), a multimedia card (MMC), an embedded MMC (eMMC), a universal serial bus (USB) flash drive, or a universal flash storage (UFS). The external memory 200A illustrated in FIGS. 1 and 2 may be a set of different types of memories. Therefore, the external memory 200A may be a set of the DRAM and the eMMC. An operating system (OS) may be loaded from the eMMC to the DRAM and then executed. When the external memory 200A is a set of different types of memories, the memory controller 213 may be a set of memory controllers that can respectively control the different types of memories.

The CPU 215 may control the host 200 to compress image data and transmit the compressed image data to the timing controller 300 through the MIPI TX interface 230.

The image type detector 217 may determine whether image data to be transmitted to the timing controller 300 is first data, for example, still image data corresponding to a still image, or second data, for example, moving image data corresponding to a moving image. The image type detector 217 may control the transmission of the image data according to the determination result. In other words, the image type detector 217 may determine whether and/or how to transmit the image data to the image processing circuit 219.

According to an embodiment, when the image data output from an image data source, i.e., the external memory 200A or the camera 200B, is the still image data, the image type detector 217 may transmit the image data to the image processing circuit 219 at a first rate, for example, 1 Hz. According to an embodiment, when the image data output from the image data source, i.e., the external memory 200A or the camera 200B, is the moving image data, the image type detector 217 may transmit the image data to the image processing circuit 219 at a second rate, for example, in a range from 2 to 60 Hz.

Consequently, the image type detector 217 may transmit image data that needs to be transmitted to the timing controller 300 or image data that needs to be updated in the display panel module 400 to the image processing circuit 219, thereby preventing unnecessary image data transmission. Although the image type detector 217 is placed between the bus 211 and the image processing circuit 219 as illustrated in FIG. 2, the present general inventive concept is not limited thereto. It is possible that the image processing circuit 219 may be placed between the bus 211 and the image type detector 217.

The image processing circuit 219 may convert the image data output from the image type detector 217 into a format that can be processed by the MIPI TX interface 230. The image processing circuit 219 may include a compressor 221. The compressor 221 may be an encoder. When the compressor 221 is enabled, the compressor 221 may compress the image data output from the image type detector 217 and transmit the compressed image data to the MIPI TX interface 230. At this time, the compressed image data may be transmitted to the timing controller 300 through only the first sub interface. In other words, the compressor 221 is enabled in a single-mode operation.

A data compression ratio of the compressor 221 may be determined to reduce power consumption of the first sub interface. For instance, when the data compression ratio is defined as an uncompressed size to a compressed size, the data compression ratio may be determined to be 2. It is possible that the data compression ratio can be changed according to a user or design preference on the reduction in power consumption.

However, when the compressor 221 is disabled, the image processing circuit 219 may process uncompressed image data output from the image type detector 217 and may transmit the processed image data to the MIPI TX interface 230. At this time, the MIPI TX interface 230 may transmit a first portion of the processed image data to the timing controller 300 through the first sub interface and may transmit a second portion of the processed image data to the timing controller 300 through the second sub interface. In other words, the compressor 221 is disabled in a dual-mode operation. The compressor 221 may be enabled of disabled according to the control of the CPU 215.

A transmission timing of the first portion and the second portion of the processed image data to the timing controller 300 may vary a user or design preference of the data processing system 100. For instance, the first portion may be transmitted to the timing controller 300 prior to the second portion or the first and second portions may be transmitted to the timing controller 300 in parallel. The first portion may be a first half, for example, a left half of the processed image data (e.g., frame data) and the second portion may be a second half, for example, a right half of the processed image data.

The camera interface 223 may transmit image data from the camera 200B to the bus 211. The camera 200B may be implemented as a complementary metal-oxide semiconductor (CMOS) image sensor. The image data received from the camera interface 223 may be processed in the host 200 in the similar way to the image data of the external memory 200A. It is possible that the host 200 may include an internal memory to store image data which can be processed in the similar way to the image data of the external memory 200A.

The TE signal detector 225 may detect a tearing effect (TE) signal TE output from the timing controller 300 and generate or output a first detection signal to the host 200, for example, the CPU 215. Although the first detection signal may be the same as or different from the TE signal TE, the first detection signal is related to the TE signal TE, and therefore, both the first detection signal and the TE signal are denoted by "TE" and generically named a "TE signal". The TE signal TE is usable to control transmission of the image data in the host 200 and/or the timing controller 300.

The MIPI TX interface 230 may receive the image data processed by the image processing circuit 219 and control a transmission timing (or a start of data transmission) of the processed image data based on the TE signal TE. At this time, the TE signal TE is an example of a signal that can prevent tearing effect.

The host 200 may also include an interrupt detector 227. The interrupt detector 227 may detect an interrupt INT indicating normality of abnormality of the MIPI interface MIF and/or normality of abnormality of the timing controller 300 and may generate or output a second detection signal to the host 200, for example, the CPU 215. The second detection signal is a signal related to the interrupt INT, and therefore, the second detection signal and the interrupt INT are both denoted by "INT" and generically named an "interrupt".

The CPU 215 may control the interrupt detector 227. The CPU 215 may analyze the interrupt INT and may transmit to the timing controller 300 a signal (or command or data) usable to eliminate the abnormality of the MIPI interface MIF and/or the abnormality of the timing controller 300.

The TE signal TE is transmitted from the timing controller 300 to the host 200 through a first line 202. The interrupt INT is transmitted from the timing controller 300 to the host 200 through a second line 203.

The host 200 may also include at least one wireless interface (not illustrated) to allow wireless communication with other devices. At this time, the host 200 may receive image data through a wired interface or the wireless interface such as Wi-Fi, wireless internet, and/or long term evolution (LTE). The data processing system 100 may support a specification of Camera 2.0.

When moving image data needs to be transmitted to the timing controller 300, the host 200 may transmit the moving image data to the timing controller 300 through the MIPI interface MIF according to the TE signal TE output from the timing controller 300.

Figure 3:
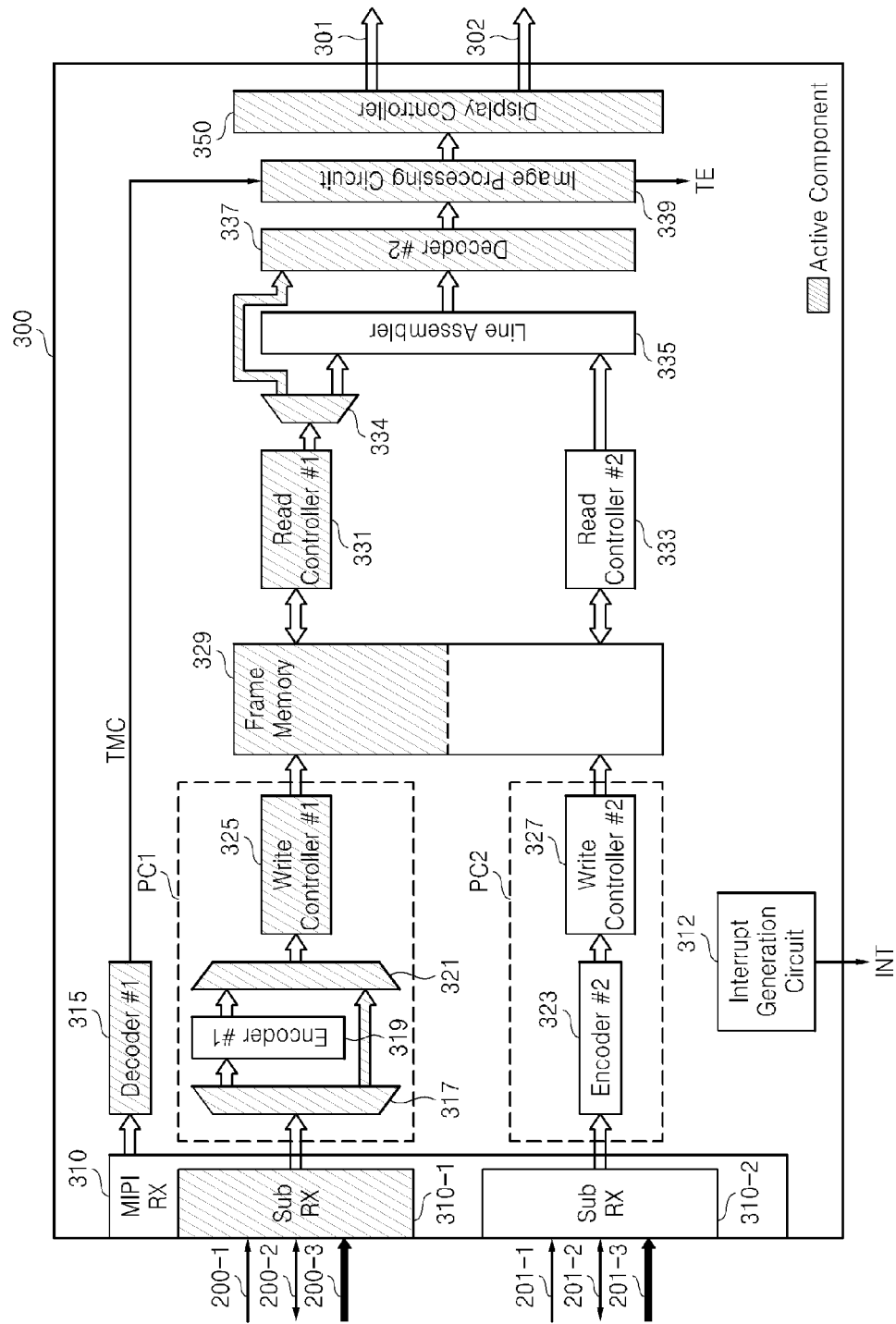
FIG. 3 is a block diagram illustrating a timing controller of the data processing system of FIG. 1 to perform a single-mode operation according to an embodiment of the present general inventive concept.

FIG. 3 is a block diagram illustrating the time controller of FIG. 1 to perform a single-mode operation according to an embodiment of the present general inventive concept. Referring to FIG. 3, the timing controller 300 includes an MIPI receive (RX) interface 310, a first decoder 315, a first processing circuit PC1, a second processing circuit PC2, a frame memory 329, a first read controller 331, a second read controller 333, a third selector 334, a line assembler 335, a second decoder 337, an image processing circuit 339, and a display controller 350.

The timing controller 300 may also include an interrupt generation circuit 312. The interrupt generation circuit 312 may transmit the interrupt INT indicating the normality or abnormality of the MIPI interface MIF and/or the normality or abnormality of the timing controller 300 to the host 200.

The timing controller 300 may be implemented as an integrated circuit (IC), a processor, or a semiconductor chip. The MIPI RX interface 310 may convert signals received through the MIPI interface MIF into signals needed by or usable in the timing controller 300. The MIPI RX interface 310 includes a first sub RX interface 310-1 connected to the first sub interface of the MIPI TX interface 230 and a second sub RX interface 310-2 connected to the second sub interface of the MIPI TX interface 230.

In the single-mode operation, the first sub RX interface 310-1 is enabled while the second sub RX interface 310-2 is disabled. In dual-mode operation, both the first and second sub RX interfaces 310-1 and 310-2 are enabled.

The first decoder 315 may decode a signal or command received from the MIPI RX interface 310 and may generate one or more signals, for example, a selection signal, an enable signal, and a timing control signal TMC according to the decoding result. The first decoder 315 may receive the instruction signal or the command generated from the host 200 through the MIPI interface MIF. The selection signal may control an operation of a first selector 317, a second selector 321, and the third selector 334. The enable signal may control an enabling or disabling operation to enable or disable at least one of components thereof, for example, the second sub RX interface 310-2, a first encoder 319, a second encoder 323, a first write controller 325, a second write controller 327, a first read controller 331, a second read controller 333, and a line assembler 335. The timing control signal TMC may control the image processing circuit 339. For instance, the timing control signal TMC may control a generation interval of the TE signal TE.

The first processing circuit PC1 includes the first selector 317, the first encoder 319, the second selector 321, and the first write controller 325. In the single-mode operation, the first processing circuit PC1 may allow the image data compressed by the host 200 to be passed (transmitted) to the first write controller 325 through the first and second selectors 317 and 321. The first write controller 325 writes the compressed image data to a first memory area in the frame memory 329. In the single-mode operation, the first encoder 319 is disabled according to the control of the first decoder 315.

However, in a dual-mode operation, the first processing circuit PC1 transmits a first portion of uncompressed image data received from the host 200 to the first encoder 319 through the first selector 317. The first encoder 319 compresses the first portion and transmits the compressed first portion to the first write controller 325 through the second selector 321. The first write controller 325 writes the compressed first portion to the first memory area in the frame memory 329.

The second processing circuit PC2 includes the second encoder 323 and the second write controller 327. The encoders 221, 319, and 323 may have the same data compression ratio. In the single-mode operation, the second processing circuit PC2 is disabled. However, in the dual-mode operation, the second processing circuit PC2 is enabled. In the dual-mode operation, the second encoder 323 compresses a second portion of the uncompressed image data received from the host 200 and transmits the compressed second portion to the second write controller 327. The second write controller 327 writes the compressed second portion to a second memory area in the frame memory 329.

The frame memory 329 may store image data compressed by at least one of the host 200 and the timing controller 300. Since the frame memory 329 stores the compressed image data, the frame memory 329 that stores the compressed image data may be implemented to have a smaller size (smaller memory capacitance) than a frame memory that stores uncompressed image data. The frame memory 329 may be implemented as an embedded DRAM (eDRAM) or a dual-port memory.

The compressed image data output from the first processing circuit PC1 that is enabled in the single-mode or the dual-mode operation (e.g., the image data compressed by the host 200 in the single mode operation or the first portion compressed by the first encoder 319 in the dual-mode operation) may be stored in the first memory area of the frame memory 329. The compressed image data output from the second processing circuit PC2 that is enabled in the dual-mode operation (e.g., the second portion compressed by the second encoder 323 in the dual-mode operation) may be stored in the second memory area of the frame memory 329.

One or more first components that process image data to be stored in the frame memory 329 may be implemented in a first clock domain while one or more second components that process image data read from the frame memory 329 may be implemented in a second clock domain. A first frequency of a first clock of the first clock domain may be higher than a second frequency of a second clock of the second clock domain.

The first read controller 331 enabled in the single-mode operation may read the compressed image data from the first memory area of the frame memory 329 and may transmit the read image data to the third selector 334. The second read controller 333 enabled in the dual-mode operation may read the compressed image data from the second memory area of the frame memory 329 and may transmit the read image data to the line assembler 335.

The third selector 334 may transmit the image data received from the first read controller 331 to the line assembler 335 or the second decoder 337. For instance, the compressed image data output from the first read controller 331 is transmitted to the second decoder 337 through the third selector 334 in the single-mode operation, while the compressed image data output from the first read controller 331 is transmitted to the line assembler 335 through the third selector 334 in the dual-mode operation.

In the dual-mode operation, the line assembler 335 assembles the compressed image data output from the first read controller 331 and the compressed image data output from the second read controller 333, synchronizes the compressed image data output from the first read controller 331 and the second read controller 333 with each other, and outputs the synchronized image data to the second decoder 337. The second decoder 337 decompresses the compressed image data output from the third selector 334 or the synchronized image data output from the line assembler 335.

The image processing circuit 339 processes the decompressed image data and outputs the processed image data to the display controller 350. The processed image data may have a characteristic different from a characteristic of the image data to be suitable or usable in an operation of the display panel module 400 to display a corresponding image thereon. The image processing circuit 339 may control a panel self-refresh (PSR) of the display panel module 400. According to an embodiment, the image processing circuit 339 may control the read controllers 331 and 333 to control the PSR. At this time, the image processing circuit 339 may control the read controllers 331 and 333 based on a control signal output from the first decoder 315. According to an embodiment, the read controllers 331 and 333 may control the number of read operations on the frame memory 329 per second based on the control signal output from the first decoder 315. The image processing circuit 339 may also generate the TE signal TE based on the timing control signal TMC.

Figure 4:
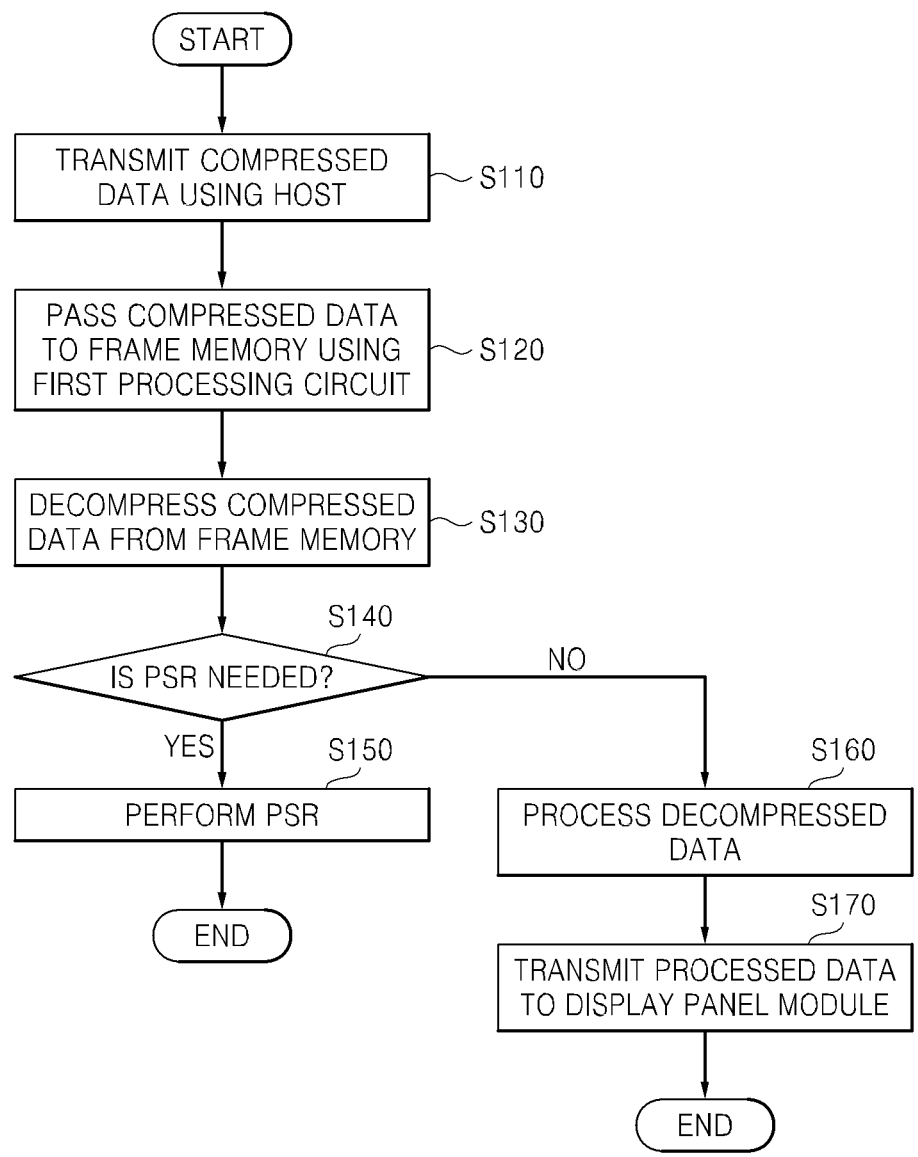
FIG. 4 is a flowchart illustrating a method of the timing controller of FIG. 3 according to an embodiment of the present general inventive concept.

FIG. 4 is a flowchart illustrating a method of the timing controller 300 of FIG. 3 according to an embodiment of the present general inventive concept. The single-mode operation of the timing controller 300 will be described in detail with reference to FIGS. 1 through 4.

When the compressor 221 of the host 200 is enabled for the single-mode operation, the compressed image data output from the compressor 221 is transmitted to the first sub RX interface 310-1 through the MIPI TX interface 230 and the first sub interface of the MIPI interface MIF in operation S110. In other words, the host 200 transmits the compressed image data to the timing controller 300 in operation S110.

Information about the compressed image data may be transmitted to the first decoder 315. The first decoder 315 may decode the information and generate one or more signals, for example, a selection signal, a control signal, and/or a timing control signal TMC corresponding to the decoding result. The information may be generated by the host 200, and the information may be transmitted to the timing controller 300 through the MIPI interface MIF.

The timing controller 300 allows the image data compressed by the host 200 to be passed (transmitted) to the frame memory 329 using the first processing circuit PC1 in operation S120. The timing controller 300 may provide the compressed image data to the frame memory 329 without any further compressing process. At this time, the first encoder is disabled. The image data compressed by the host 200 is transmitted to the first write controller 325 through the selectors 317 and 321, and the first write controller 325 writes the compressed image data to the first memory area of the frame memory 329 in operation S120.

The first read controller 331 reads the compressed image data from the first memory area of the frame memory 329. The read image data is transmitted to the second decoder 337 through the third selector 334. The second decoder 337 decompresses the compressed image data transmitted from the frame memory 329 in operation S130.

When the decompressed image data is moving image data, that is, when the PSR is not necessary in a case of NO in operation S140, the image processing circuit 339 processes the decompressed image data and transmits the processed image data to the display panel module 400 through the display controller 350 and the display interface 301 and 302 in operation S170. Here, a reference numeral 301 denotes a column driver interface and a reference numeral 302 denotes a row driver interface. However, when the decompressed image data is still image data, that is, when the PSR is necessary in a case of YES in operation S140, the timing controller 300 performs the PSR. The PSR may be performed at a frequency, for example, 60 Hz.

According to an embodiment, the first read controller 331 may read the compressed image data from the first memory area of the frame memory 329 periodically (e.g., at 60 Hz) and may output the read image data to the second decoder 337 through the third selector 334 according to the control of the image processing circuit 339 to perform the PSR. At this time, operations S160 and S170 may be subsequently performed.

According to an embodiment, the first read controller 331 may read the compressed image data from the first memory area of the frame memory 329 periodically (e.g., at 60 Hz) and may output the read image data to the second decoder 337 through the third selector 334 according to the control signal output from the first decoder 315 to perform the PSR. At this time, operations S160 and S170 may be subsequently performed.

The reading the compressed image data from the first memory area of the frame memory 329 for the PSR may be performed in parallel with operation S160 and/or operation S170. At least one component to control the first read controller 331 to perform the PSR may be changed variously according to a design specification of the timing controller 300.

In the single-mode operation, the second sub RX interface 310-2, the second processing circuit PC2, the second read controller 333, and the line assembler 335 may be disabled.

Figure 5:
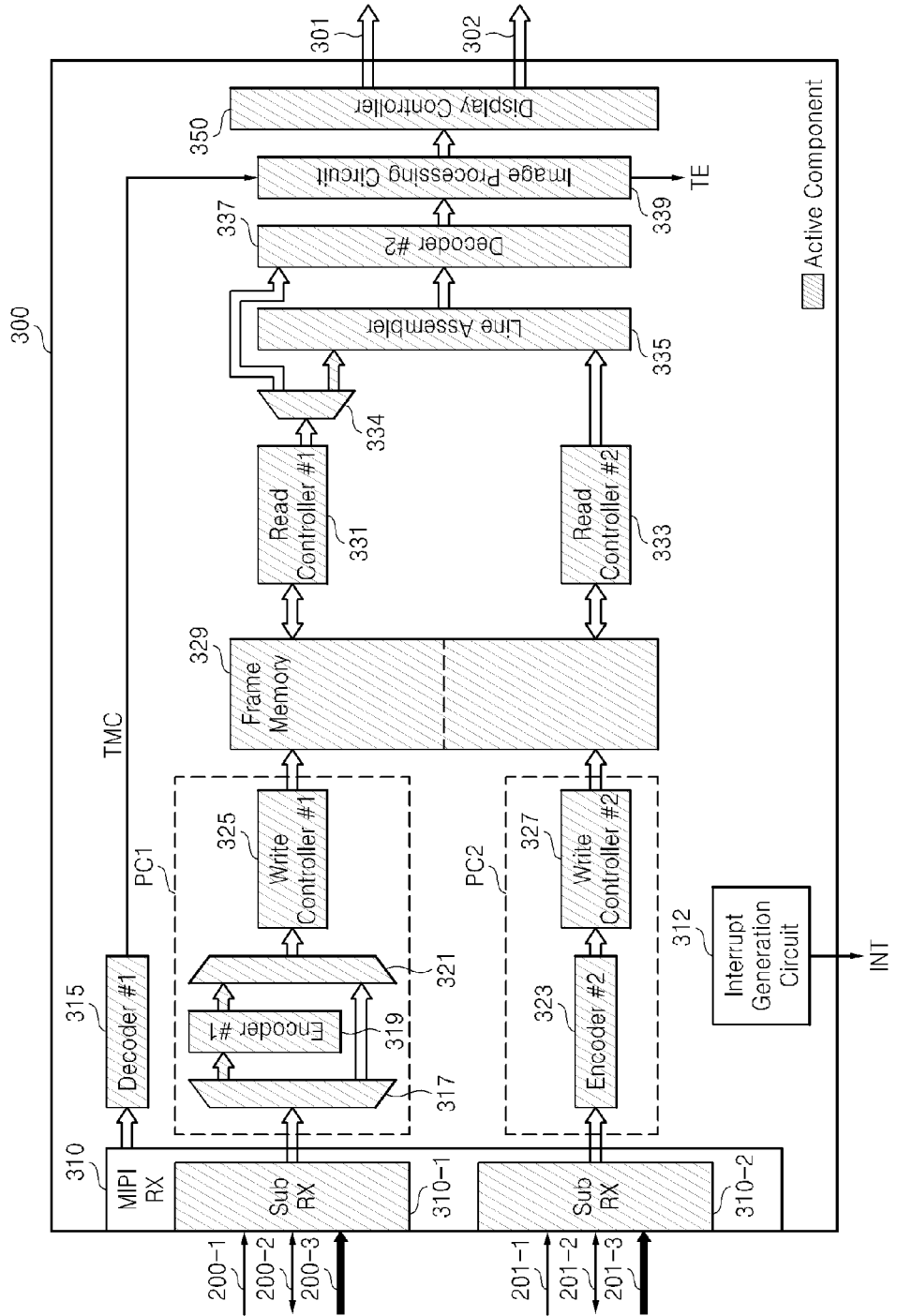
FIG. 5 is a block diagram illustrating a timing controller of the data processing system of FIG. 1 to perform a dual-mode operation according to an embodiment of the present general inventive concept.
Figure 6:
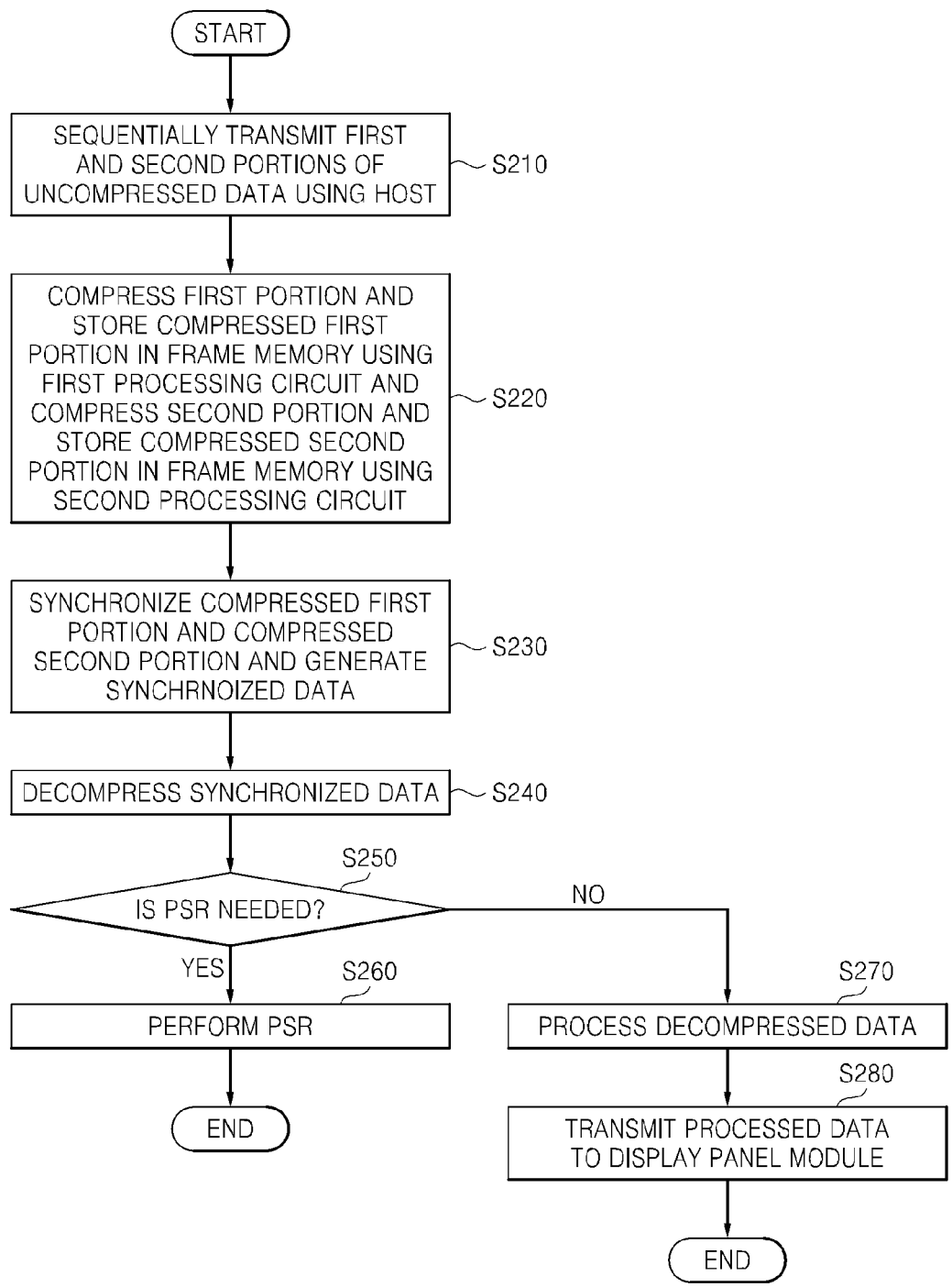
FIG. 6 is a flowchart illustrating a method of the timing controller of FIG. 5 according to an embodiment of the present general inventive concept.

FIG. 5 is a block diagram illustrating the timing controller 300 of FIG. 1 to perform a dual-mode operation according to an embodiment of the present general inventive concept. FIG. 6 is a flowchart illustrating a method of the timing controller 300 of FIG. 5 according to an embodiment of the present general inventive concept. The dual-mode operation of the timing controller 300 will be described in detail with reference to FIGS. 1, 2, 5, and 6.

When the compressor 221 of the host 200 is disabled for the dual-mode operation, the first portion of the uncompressed image data is transmitted to the first sub RX interface 310-1 through the first sub interface of the MIPI interface MIF and the second portion of the uncompressed image data is transmitted to the second sub RX interface 310-2 through the second sub interface of the MIPI interface MIF. In other words, the host 200 transmits the first portion and the second portion to the first and second sub RX interfaces 310-1 and 310-2 through the corresponding sub interfaces, respectively, in operation S210.

As described above, the host 200 may transmit the first portion and the second portion sequentially or in parallel to the timing controller 300.

The first decoder 315 may decode an instruction signal or a command that instructs the data processing system 100 to perform the dual-mode operation and may generate a selection signal, a control signal, and/or the timing control signal TMC according to the decoding result. The instruction signal and the command may be generated by the host 200. The first portion of the uncompressed image data from the host 200 is input to the first processing circuit PC1. The first decoder 315 may receive the instruction signal or the command generated from the host 200 through the MIPI interface MIF.

The first selector 317 transmits the first portion to the first encoder 319 according to the control of the first decoder 315. The first encoder 319 compresses the first portion and transmits the compressed first portion to the second selector 321. The second selector 321 transmits the first portion compressed by the first encoder 319 to the first write controller 325 according to the control of the first decoder 315. The first write controller 325 writes the compressed first portion to the first memory area of the frame memory 329.

The second portion of the uncompressed image data from the host 200 is input to the second processing circuit PC2. The second encoder 323 compresses the second portion and transmits the compressed second portion to the second write controller 327. The second write controller 327 writes the compressed second portion to the second memory area of the frame memory 329.

During the dual-mode operation, at least one of the components 319, 323, 325, 327, 331, 333, and 335 may be enabled according to the control of the first decoder 315.

The timing controller 300 may compress the first portion using the first processing circuit PC1 and store the compressed first portion in the first memory area of the frame memory 329, and the timing controller 300 may also compress the second portion using the second processing circuit PC2 and store the compressed second portion in the second memory area of the frame memory 329 in operation S220.

The first read controller 331 reads the compressed first portion from the first memory area of the frame memory 329 and outputs the read first portion to the line assembler 335 through the third selector 334. The second read controller 333 reads the compressed second portion from the second memory area of the frame memory 329 and outputs the read second portion to the line assembler 335. The operation of the first read controller 331 and the operation of the second read controller 333 may be performed sequentially or in parallel.

The line assembler 335 may assemble the compressed first portion output from the first read controller 331 and the compressed second portion output from the second read controller 333, synchronize the compressed first portion and the compressed second portion with each other, and output the synchronized first and second portions as synchronized image data to the second decoder 337 in operation S230.

The second decoder 337 decompresses the synchronized image data output from the line assembler 335 in operation S240. When the decompressed image data is moving image data, that is, when PSR is not needed in a case of NO in operation S250, the image processing circuit 339 may process the decompressed image data in operation S270 and may transmit the processed image data to the display panel module 400 through the display controller 350 and the display interfaces 301 and 302 in operation S280. The processed image data may have a characteristic different from a characteristic of the image data to be suitable or usable in an operation of the display panel module 400 to display a corresponding image thereon.

However, when the decompressed image data is still image data, that is, when PSR is needed in a case of YES in operation S250, the timing controller 300 performs the PSR. In an embodiment, to perform the PSR, the first read controller 331 may read the compressed first portion from the first memory area of the frame memory 329 and output the first portion to the line assembler 335 according to the control of the image processing circuit 339. In addition, the second read controller 333 may read the compressed second portion from the second memory area of the frame memory 329 and output the second portion to the line assembler 335 according to the control of the image processing circuit 339.

In an embodiment, to perform the PSR, the read controllers 331 and 333 may read the compressed first portion and the compressed second portion from the first and second memory areas, respectively, of the frame memory 329 and output the read first and second portions, respectively, to the line assembler 335 according to the control signal output from the first decoder 315.

The reading the first portion from the first memory area and the second portion from the second memory area may be performed in parallel with operation S240, S270, or S280 to perform the PSR. In addition, at least one component that controls each of the read controllers 331 and 333 to perform the PSR may vary according to a design specification of the timing controller 300.

Figure 7:
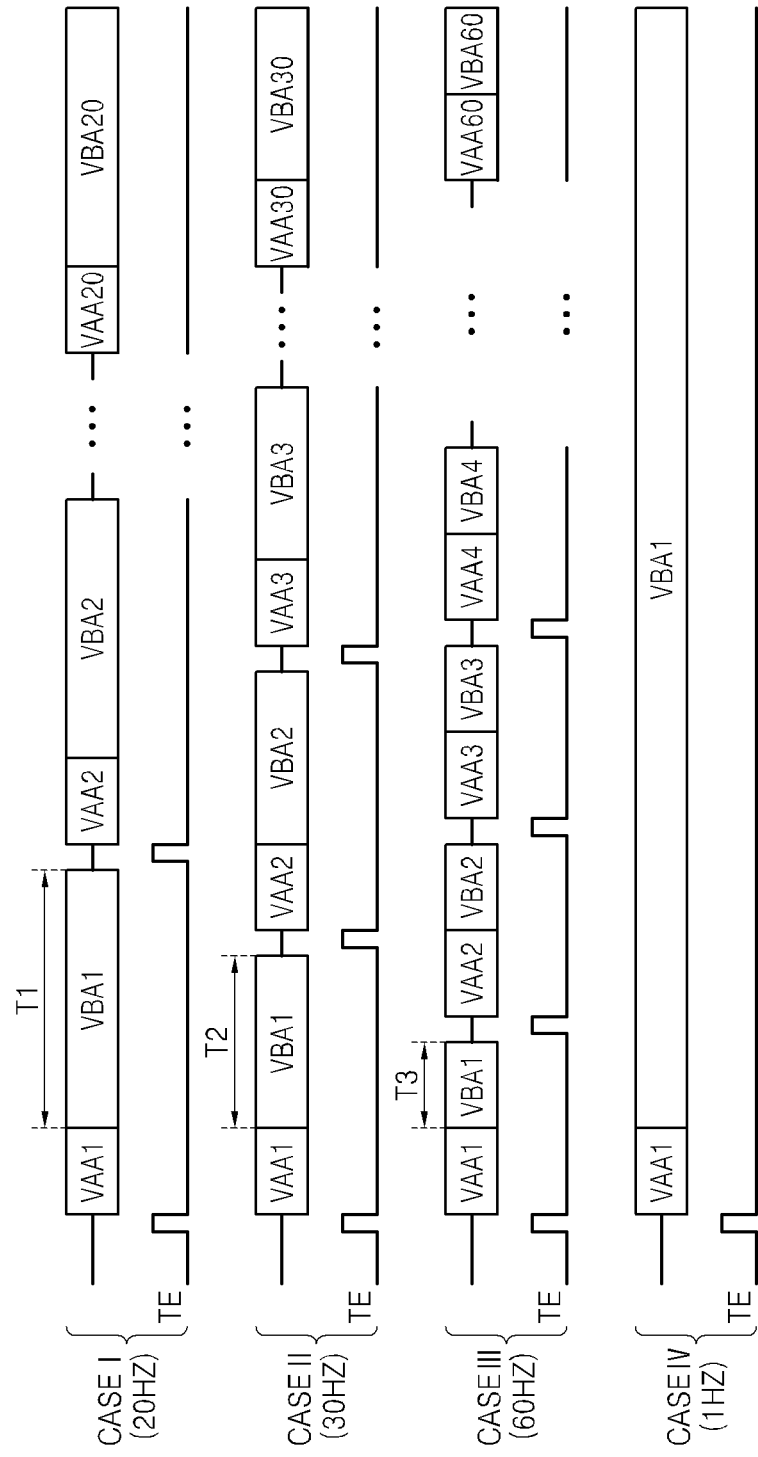
FIG. 7 is a timing chart illustrating a method of controlling a transmission timing of image data transmitted from a host to a timing controller in a data processing system according to an embodiment of the present general inventive concept.
Figure 8:
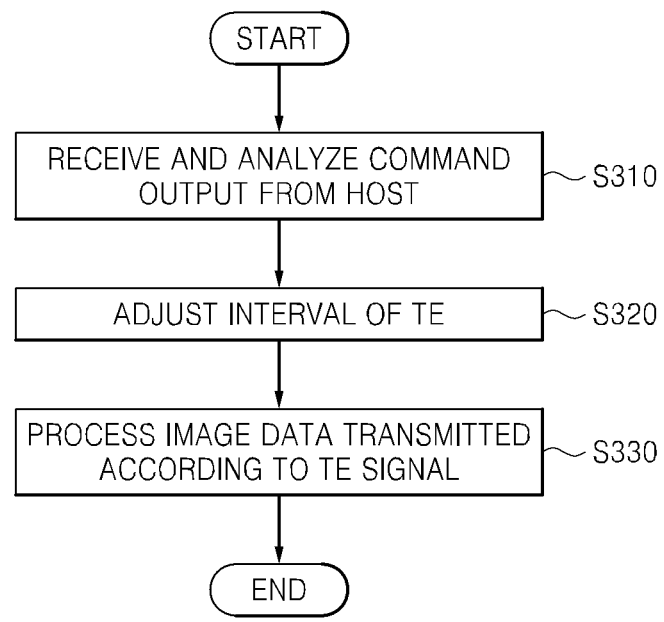
FIG. 8 is a flowchart illustrating a method of controlling a transmission timing of image data transmitted from a host to a timing controller in a data processing system according to an embodiment of the present general inventive concept.

FIG. 7 is a timing chart illustrating a method of controlling a transmission timing of image data transmitted from the host 200 to the timing controller 300, and FIG. 8 is a flowchart illustrating a method of controlling the transmission timing of the image data transmitted from the host 200 to the timing controller 300, according to an embodiment of the present general inventive concept.

Referring to FIGS. 1 through 8, the transmission timing of the image data may be controlled according to a size of a vertical blank area. The first decoder 315 receives and analyzes a command from the host 200 and outputs the timing control signal TMC corresponding to the analysis result to the image processing circuit 339 in operation S310.

For instance, the command may be a vendor specific command to control the transmission timing of the image data. The command may be transmitted in a form of a packet. The command may include (or indicate) a vertical active area VAA and a vertical blank area VBA. Although the term "command" is used here, the command may indicate a signal, information, or a packet. The vertical active area VAA may include image data or frame data.

The image processing circuit 339 may adjust an interval of the TE signal TE based on the timing control signal TMC and may transmit the interval-adjusted TE signal TE to the host 200 in operation S320. The host 200 may control the transmission timing of the image data to be transmitted to the timing controller 300 according to the interval-adjusted TE signal TE.

The timing controller 300 may process the image data transmitted according to the TE signal TE in operation S330. At this time, the image data may be compressed image data or uncompressed image data. The compressed image data may be still image data or moving image data. The uncompressed image data may also be still image data or moving image data. When the quality of a picture is important, the host 200 may transmit the uncompressed image data to the timing controller 300. When the quality of a picture is not important, the host 200 may transmit the compressed image data to the timing controller 300.

As illustrated in FIG. 7, an i-th frame includes an i-th vertical active area VAAi and an i-th vertical blank area VBAi. Here, "i" is a natural number.

As illustrated in a CASE III, when a size of the vertical blank area VBA1 is T3, the host 200 may transmit moving image data to the timing controller 300 at a frequency, for example, 60 Hz in response to the TE signal TE, for example, a 60-Hz TE signal TE. The host 200 increases (adjusts) the size T3 of the vertical blank area VBA1 two-fold and transmits a command indicating that the size is increased two-fold to the timing controller 300 in order to control the timing of transmission of the image data to the timing controller 300.

The first decoder 315 of the timing controller 300 receives and analyzes the command from the host 200 and outputs the timing control signal TMC corresponding to the analysis result to the image processing circuit 339 in operation S310. The image processing circuit 339 increases the interval of the TE signal TE based on the timing control signal TMC.

When the size of the vertical blank area VBA1 is T2 (i.e., T2=2*T3) as the interval of the TE signal TE increases, as illustrated in a CASE II, the host 200 may transmit the moving image data to the timing controller 300 at a frequency, for example, 30 Hz, in response to the TE signal TE, for example, a 30-Hz TE signal TE. At this time, the timing controller 300 may perform the PSR. For instance, the timing controller 300 may transmit the same image data two times to the display panel module 400 for the PSR. The PSR may be performed at a frequency, for example, 60 Hz.

The host 200 increases (adjusts) the size T3 of the vertical blank area VBA1 three-fold and transmits a command indicating that the size is increased three-fold to the timing controller 300 in order to control the timing of transmission of the image data to the timing controller 300.

The first decoder 315 of the timing controller 300 receives and analyzes the command from the host 200 and outputs the timing control signal TMC corresponding to the analysis result to the image processing circuit 339 in operation S310. The image processing circuit 339 increases (adjusts) the interval of the TE signal TE based on the timing control signal TMC.

When the size of the vertical blank area VBA1 is T1 (i.e., T1=3*T3) as the interval of the TE signal TE increases, as illustrated in a CASE I, the host 200 may transmit the moving image data to the timing controller 300 at a frequency, for example, 20 Hz in response to the TE signal TE, for example, a 20-Hz TE signal TE. At this time, the timing controller 300 may perform the PSR. For instance, the timing controller 300 may transmit the same image data three times to the display panel module 400 for the PSR.

The host 200 may increase the size T3 of the vertical blank area VBA1 in 60-fold and transmits a command indicating that the size is increased 60-fold to the timing controller 300 in order to control the timing of transmission of the image data to the timing controller 300.

The first decoder 315 of the timing controller 300 receives and analyzes the command from the host 200 and outputs the timing control signal TMC corresponding to the analysis result to the image processing circuit 339 in operation S310. The image processing circuit 339 increases the interval of the TE signal TE based on the timing control signal TMC.

When the size of the vertical blank area VBA1 is 60*T3 as the interval of the TE signal TE increases, as illustrated in a CASE IV, the host 200 may transmit still image data to the timing controller 300 in response to the TE signal TE. At this time, the timing controller 300 may perform the PSR. For instance, the timing controller 300 may transmit the same still image data 60 times to the display panel module 400 for the PSR.

Consequently, the timing controller 300 may adjust the interval of the TE signal TE based on the command transmitted from the host 200 in real time. Accordingly, the host 200 may adaptively adjust the transmission timing of the image data to be transmitted to the timing controller 300 based on the interval-adjusted TE signal TE in real time.

The timing chart illustrated in FIG. 7 is conceptually illustrated for an example for convenience' sake in the description, and therefore, the inventive concept is not restricted thereto.

Figure 9:
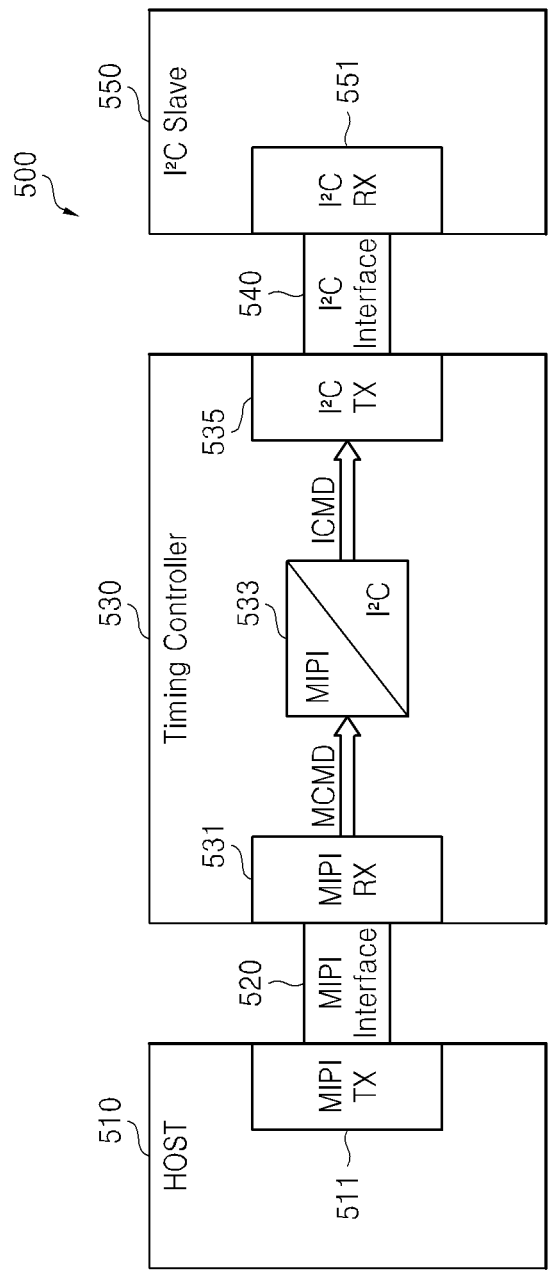
FIG. 9 is a block diagram illustrating a data processing system according to an embodiment of the present general inventive concept.

FIG. 9 is a block diagram illustrating a data processing system 500 according to an embodiment of the present general inventive concept. Referring to FIG. 9, the data processing system 500 may include a host 510, a timing controller 530, and a device 550.

The host 510 includes an MIPI TX interface 511. The timing controller 530 includes an MIPI RX interface 531, a command converter 533, and an inter-integrated chip ($I^2C$) TX interface 535. The device 550 includes an $I^2C$ RX interface 551. The host 510 and the timing controller 530 are connected with each other through an MIPI interface 520 corresponding to the MIPI TX interface 511 and the MIPI RX interface 531. The timing controller 530 and the device 550 are connected with each other through the $I^2C$ interface 540 corresponding to the $I^2C$ TX interface 535 and the $I^2C$ RX interface 551.

The timing controller 530 may function as a bridge chip and an $I^2C$ master. At this time, the device 550 may function as an $I^2C$ slave.

The command converter 533 may convert an MIPI command MCMD into an $I^2C$ command ICMD. Accordingly, the host 510 may control the device 550, which supports an $I^2C$ protocol, using the MIPI command MCMD without using an additional $I^2C$ interface.

For instance, when a control signal for controlling the device 550 is included in each of a plurality of MIPI commands MCMD, the command converter 533 may parse the MIPI commands MCMD and packetize control signals detected as a result of the parsing, thereby generating a packet. The packet may be the $I^2C$ command ICMD.

The data processing system 500 may be implemented as a smart phone, a tablet PC, a digital camera, a camcorder, a PDA, a PMP, a mobile internet device (MID), or a wearable computer.

The timing controller 300 illustrated in FIG. 1 may also include the command converter 533. At this time, the data processing system 100 illustrated in FIG. 1 may also include a device that uses an $I^2C$ interface, e.g., an $I^2C$ slave, besides the display panel module 400.

As described above, according to an embodiment of the inventive concept, a timing controller performs PSR with respect to a display using compressed data. In addition, a host controls a timing of transmission of image data from the host to the timing controller using frame information (i.e., information about a size of a vertical blank area). The host also controls an external device that supports an $I^2C$ protocol using a MIPI command.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include a processor, a semiconductor memory, a read-only memory (ROM), a random-access memory (RAM), a USB memory, a memory card, a blue-ray disc, CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A method of operating a timing controller which communicates with a host through a mobile industry processor interface (MIPI) interface and communicates with a display panel module through a display interface, the method comprising:
storing image data compressed by one of the host and the timing controller in a frame memory;
decompressing the image data stored in the frame memory; and
performing panel self-refresh on the display panel module using the decompressed image data,
wherein when the image data is first image data compressed by the host, the first image data is passed to the frame memory,
wherein when the image data is second image data compressed by the timing controller, a first portion of the second image data and a second portion of the second image data are stored in the frame memory at different timings,
wherein the first image data is passed to the frame memory in a single-mode operation and the first portion is generated by compressing first uncompressed image data corresponding to the first portion and storing the first portion in the frame memory in a dual-mode operation,
wherein the second portion is generated by compressing second uncompressed image data corresponding to the second portion and storing the second portion in the frame memory in the dual-mode operation.

2. The method of claim 1, wherein the decompressing the image data comprises:
assembling and synchronizing the first portion and the second portion which are output from the frame memory; and
decompressing the first portion and the second portion that have been synchronized with each other.

3. The method of claim 1, wherein:
the timing controller receives first uncompressed image data and second uncompressed image data, and
the first uncompressed image data and second uncompressed image data are compressed at different timings by different compression circuits, which are implemented in the timing controller to, respectively, correspond to the first portion and the second portion.

4. The method of claim 3, wherein the first uncompressed image data is received from the host through a first sub interface of the MIPI interface and the second uncompressed image data is received from the host through a second sub interface of the MIPI interface.

5. The method of claim 1, wherein the first image data and the first portion of the second image data are output to the frame memory through one processing circuit.

6. The method of claim 1, further comprising:
receiving a command from the host through the MIPI interface and analyzing the command; and
adjusting an interval of a tearing off (TE) signal based on an analysis result.

7. The method of claim 6, wherein the command comprises information about a size of a vertical blank area.

8. A timing controller which is connected with a host through a
mobile industry processor interface (MIPI) interface and connected with a display panel module through a display interface, the timing controller comprising:
a frame memory configured to store image data compressed by one of the host and the timing controller;
a decoder configured to decompress the image data stored in the frame memory;
an image processing circuit configured to perform panel self-refresh on the display panel module using the decompressed image data;
a processing circuit configured to pass the image data to the frame memory when the image data is first image data compressed by the host and to store a first portion of the image data and a second portion of the image data in the frame memory at different timings when the image data is second image data compressed by the timing controller,
wherein the processing circuit comprises:
a first processing circuit configured to pass the first image data to the frame memory in a single-mode operation and to generate the first portion by compressing first uncompressed image data corresponding to the first portion and store the first portion in the frame memory in a dual-mode operation, and
a second processing circuit configured to generate the second portion by compressing second uncompressed image data corresponding to the second portion and store the second portion in the frame memory in the dual-mode operation.

9. The timing controller of claim 8, further comprising:
a line assembler configured to assemble and synchronize the first portion and the second portion which are output from the frame memory and to output synchronized image data to the decoder,
wherein the decoder decompresses the synchronized image data.

10. The timing controller of claim 8, further comprising:
a second decoder configured to analyze a command received from the host through the MIPI interface and output a timing control signal according to an analysis result,
wherein the image processing circuit adjusts an interval of a tearing effect (TE) signal based on the timing control signal and transmits an interval-adjusted TE signal to the host.

11. The timing controller of claim 10, wherein the command comprises information about a size of a vertical blank area.

12. The timing controller of claim 8, wherein the first uncompressed image data and second uncompressed image data are compressed at different timings by different compression circuits which are implemented in the timing controller to, respectively, correspond to the first portion and the second portion.

13. A data processing system comprising:
the timing controller and the display panel module of claim 8;
wherein the host and the timing controller are external to each other and connected through the MIPI, and the timing controller and the display panel module are external to each other and connected through the display interface.

14. The data processing system of claim 13, wherein: the timing controller further comprises a line assembler configured to assemble and synchronize the first portion and the second portion which are output from the frame memory and to output synchronized image data to the decoder; and the decoder decompresses the synchronized image data.

15. The data processing system of claim 13, wherein:

the timing controller further comprises a second decoder configured to analyze a command received from the host through the MIPI interface and output a timing control signal according to an analysis result; and the image processing circuit adjusts an interval of a tearing effect (TE) signal based on the timing control signal and transmits an interval-adjusted TE signal to the host.

16. The data processing system of claim 15, wherein the command comprises information about a size of a vertical blank area.

17. A timing controller for receiving image data from a host through a mobile industry processor interface (MIPI) and connected with a display panel module, the timer controller comprising:

an interface comprising MIPI first and second sub-interfaces for receiving image data from the host;

a first processing circuit configured to receive first image data from the first sub-interface, and including at least one selector, a first encoder, and a first write controller;

a second processing circuit configured to receive second image data from the second sub-interface, and including a second encoder and a second write controller;

a frame memory for storing the image data;

a decoder configured to decompress the image data stored in the frame memory; and an image processing circuit configured to perform panel self-refresh on the display panel module using the decompressed image data, wherein in a single-mode operation, the first sub-interface is enabled and the second sub-interface is disabled, and in dual-mode operation both the first and second sub-interfaces are enabled;

wherein in the single-mode operation, the first processing circuit allows first image data compressed by the host to be transmitted to the first write controller through the at least one selector and bypassing the first encoder, the first write controller being configured to write the compressed first image data to the frame memory, wherein in a dual mode operation, the first processing circuit transmits an uncompressed first portion of image data received from the host through the at least one selector to the first encoder which compresses the first portion of image data and sends it to the first write controller for writing the first portion of image data into a first portion of the frame memory, wherein in the single-mode operation the second processing circuit is disabled, and in the dual-mode operation the second processing circuit transmits an uncompressed second portion of image data received from the host to the second encoder which compresses the second portion of image data and sends it to the second write controller for writing the second portion of image data into a second portion of the frame memory.

18. The timing controller of claim 17, further comprising:

a line assembler configured to assemble and synchronize the first portion of image data and the second portion of image data which are output from the frame memory and to output synchronized image data to the decoder, wherein the decoder decompresses the synchronized image data.

19. The timing controller of claim 17, wherein the first and second portions of image data are stored in the frame memory at different timings.

20. The timing controller of claim 17, further comprising:

a second decoder configured to analyze a command received from the host through the MIPI interface and output a timing control signal according to an analysis result, wherein the image processing circuit adjusts an interval of a tearing effect (TE) signal based on the timing control signal and transmits an interval-adjusted TE signal to the host.

* * * * *